(12) United States Patent
McCabe

(10) Patent No.: US 6,454,528 B2
(45) Date of Patent: Sep. 24, 2002

(54) INTAKE AND EXHAUST DAMPER WITH MOVABLE MOTOR FAN ASSEMBLY

(76) Inventor: Francis J. McCabe, P.O. Box 1547, Doylestown, PA (US) 18901

( * ) Notice: Subject to any disclaimer, the term of this patent is extended or adjusted under 35 U.S.C. 154(b) by 44 days.

(21) Appl. No.: 09/777,407

(22) Filed: Feb. 6, 2001

Related U.S. Application Data

(63) Continuation-in-part of application No. 09/368,370, filed on Aug. 4, 1999, now Pat. No. 6,190,122.

(51) Int. Cl.[7] ............................................... F04D 29/56
(52) U.S. Cl. ..................... 415/147; 415/146; 415/148; 415/150; 415/151; 454/351; 454/352; 474/79

(58) Field of Search ................................. 415/146, 147, 415/148, 150, 151; 454/351, 352; 474/79, 113–117

(56) References Cited

U.S. PATENT DOCUMENTS

| | | | | |
|---|---|---|---|---|
| 2,141,923 A | * | 12/1938 | McMahan | 454/351 |
| 6,010,307 A | * | 1/2000 | McCabe | 415/146 |
| 6,039,533 A | * | 3/2000 | McCabe | 415/146 |
| 6,190,122 B1 | * | 2/2001 | McCabe | 415/146 |

* cited by examiner

Primary Examiner—Christopher Verdier
(74) Attorney, Agent, or Firm—Frank Benasutti

(57) ABSTRACT

An intake and exhaust damper assembly has a motor and fan assembly pivotally mounted for movement toward and away from a louvered rotatable blade damper.

7 Claims, 6 Drawing Sheets

INTAKE AND EXHAUST DAMPER WITH MOVABLE MOTOR FAN ASSEMBLY

CROSS-REFERENCE TO RELATED APPLICATION

This application is a continuation-in-part of my prior co-pending patent application Ser. No. 09/368,370, filed Aug. 4, 1999, now U.S. Pat. No. 6,190,122, entitled INTAKE AND EXHAUST AIR DAMPER WITH MOVABLE MOTOR FAN ASSEMBLY, the disclosure of which is incorporated herein by reference as if fully set forth.

BACKGROUND OF THE INVENTION

1. Technical Field

This invention relates to a motorized fan and air damper assembly preferably for use to exhaust air flow out of a building or suck air into a building. More particularly, it relates to such a device in which the motor driving the fan is movable toward and away from the damper.

2. Background Art

In the prior art, it is known to have louvered dampers with pivotally movable blades. These dampers are amounted in the wall of a building to exhaust the air from the interior of the building or to draw air into the interior of the building. Typically, these dampers are air flow operated or have a motorized actuating device to pivot the laterally disposed slats or blades of the damper in order to permit the intake or outflow of air. Typically, out flow air energy (which robs from flow performance) is employed to open the damper. Intake air assemblies must be motorized. When the fan propeller thrust is employed instead of air flow energy, the air moving energy is not reduced for damper operation, thereby significantly improving fan performance and eliminating the need for motorized damper actuation.

DISCLOSURE OF THE INVENTION

Summary of the Invention

My invention comprises a number of improvements in this type of apparatus which enhance its functioning. In particular, I provide a motor and fan assembly mounted on a pivotable frame connected to a damper. The fan acts as a propeller and rotates the motor/fan assembly toward and away from the blades of the damper in accordance with the preferred embodiments. The assembly is so connected and arranged that the thrust of the air flow in response to the rotation of the blades of the fan actuates the blades in the damper to open the damper, and moves the motor and fan assembly.

DESCRIPTION OF THE PREFERRED EMBODIMENTS

Figure 1:
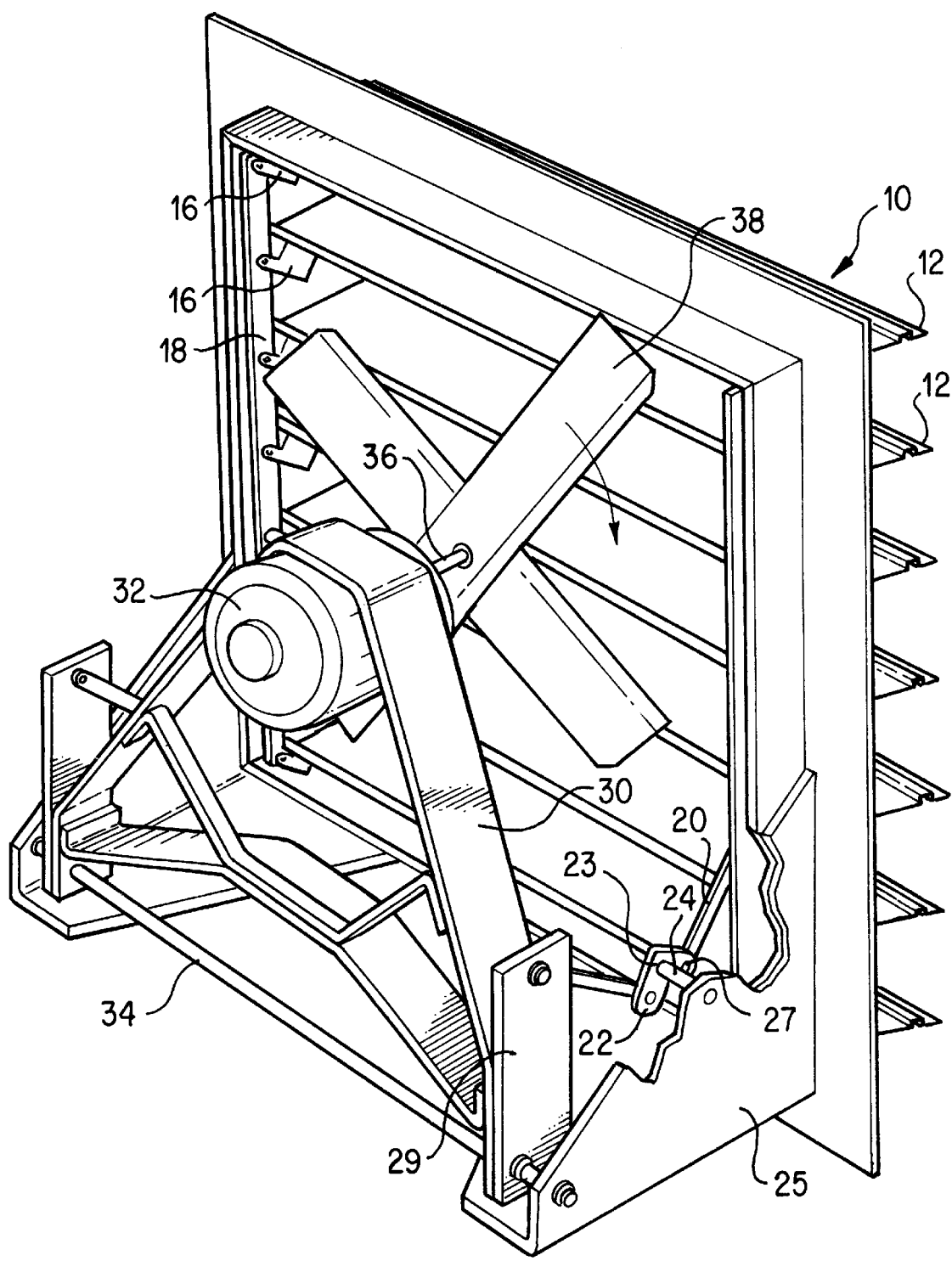
FIG. 1 shows a perspective view of a motorized fan and multi-blade damper box in accordance with my invention.

Referring to the Figures, a fan damper box motor assembly is shown in accordance with my invention for use as an exhaust fan means. This comprises a multi-blade damper designated generally 10 having a plurality of horizontally disposed blades 12 pivotally mounted therein so as to be actuated to swing to an open position (shown) in FIGS. 1 and 2 or to a closed position shown in FIG. 3. The blades may be conveniently mounted to perform this function attached to stationary blade hangers fixed to the frame (as is known in the art). Attached at one end of each blade, by any suitable means, is a blade bracket 16. Each bracket is pivotally mounted to a blade bar 18. As the bar 18 is raised and lowered vertically (when viewed as in FIG. 2), the blades will either swing closed or opened, respectively.

To cause this to occur, a drag link 20 is provided pivotally connected at one end to the blade bar 18 and at the other end to a pivotally mounted lever arm 22. The lever arm 22 has three holes to pivot about. One of these holes receives the pin 24 which is fixedly mounted to frame 25. The vertical movement aforesaid is provided when the lever arm 22 is pivoted about the pin 24 in the hole 23. Another of the holes 27 provides a means to pivotally connect the lever arm 22 to the drag link 20 at one end thereof; thus causing movement thereof in response to movement of said lever arm 22. The other end of the lever arm 22 is pivotally connected to an arm 26 mounted in such a manner that it can pivot about the rod 28. The rod 28 is fixedly mounted to the upstanding bracket 29 which is pivotally mounted to the frame 25. A motor 32 is fixedly mounted to a yoke 30 which is pivotally mounted to a tie rod 34 which is mounted in the frame 25 through the bracket 29. The motor has a shaft 36 upon which is mounted a fan 38 for rotation therewith.

Figure 2:
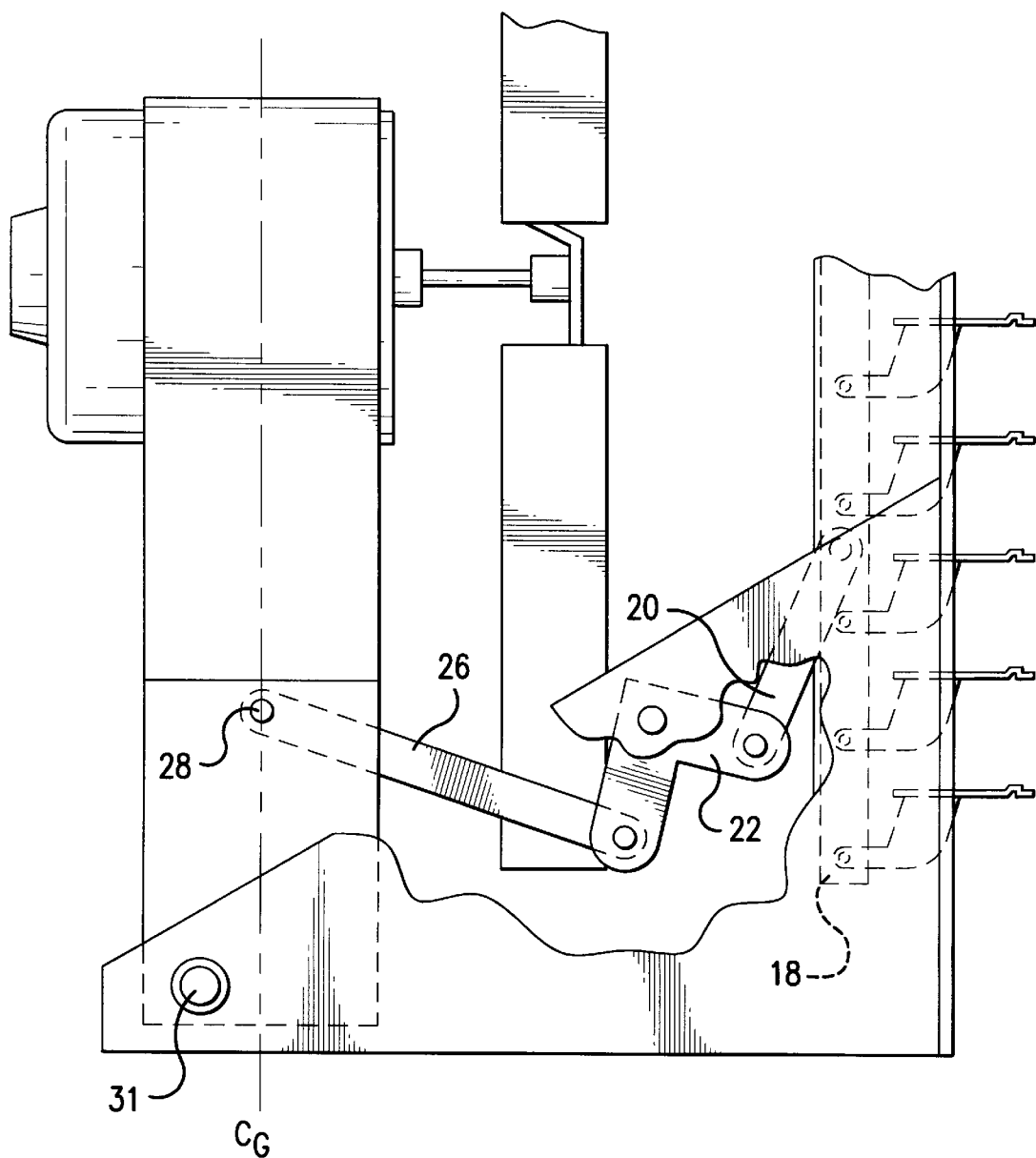
FIG. 2 shows a right side elevation of the device shown in FIG. 1.
Figure 3:
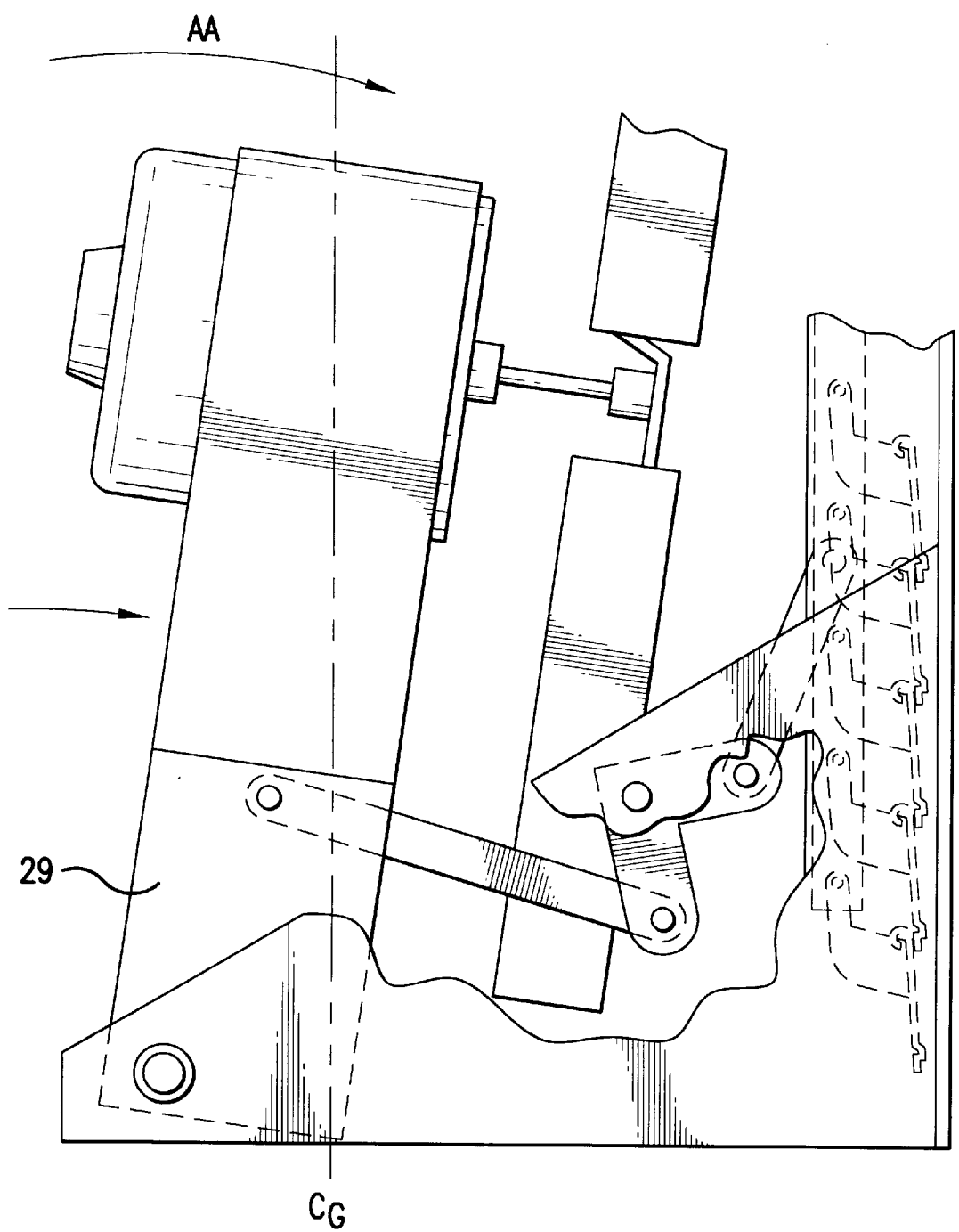
FIG. 3 shows a right side elevation of the device shown in FIG. 2, with certain parts in a different position.

When the apparatus is in the position shown in FIG. 3, and the motor 32 is turned on, the fan blades 38 rotate clockwise and the air generated by them automatically forces the multiple blades 12 of the damper to the open position (FIG. 2). The air flow is to exhaust air from the building, as the motor and fan assembly pivots backwardly from the position shown in FIG. 3, to the position shown in FIG. 2. The pivotally mounted parts 30, 26, 22,20, 18 and 16 cause the blades of the damper to open. The backward travel of the fan and motor assembly is limited by this linkage of parts. The assembly travels only so far back to a position in which its center of gravity (CG) is forward of its pivot point 31. (See FIG. 2.) Thus, when the motor is turned off, the weight of the motor/fan assembly pivots it forward in the direction of the arrow AA to close the damper. The forward bottom corner of the bracket 29 is provided to inhibit the motor assembly from traveling too far forward and engaging the rear of the blades or their mountings.

The motor may be directly connected to the fan or may operate through a belt and pulley drive if, for example, a slower speed is desired.

Figure 4:
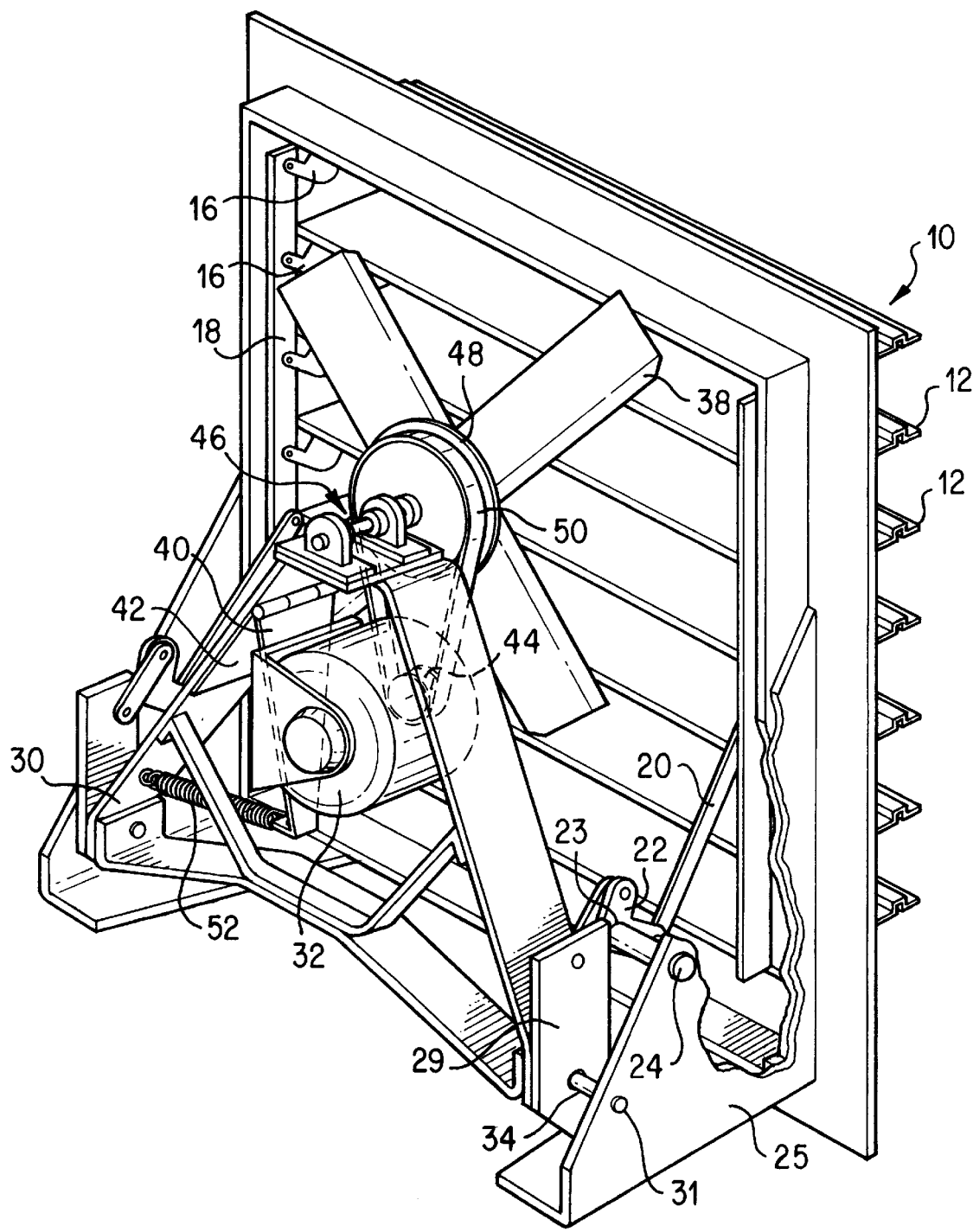
FIG. 4 shows a perspective view of a motorized fan and multi-blade damper box in accordance with another embodiment of my invention.
Figure 5:
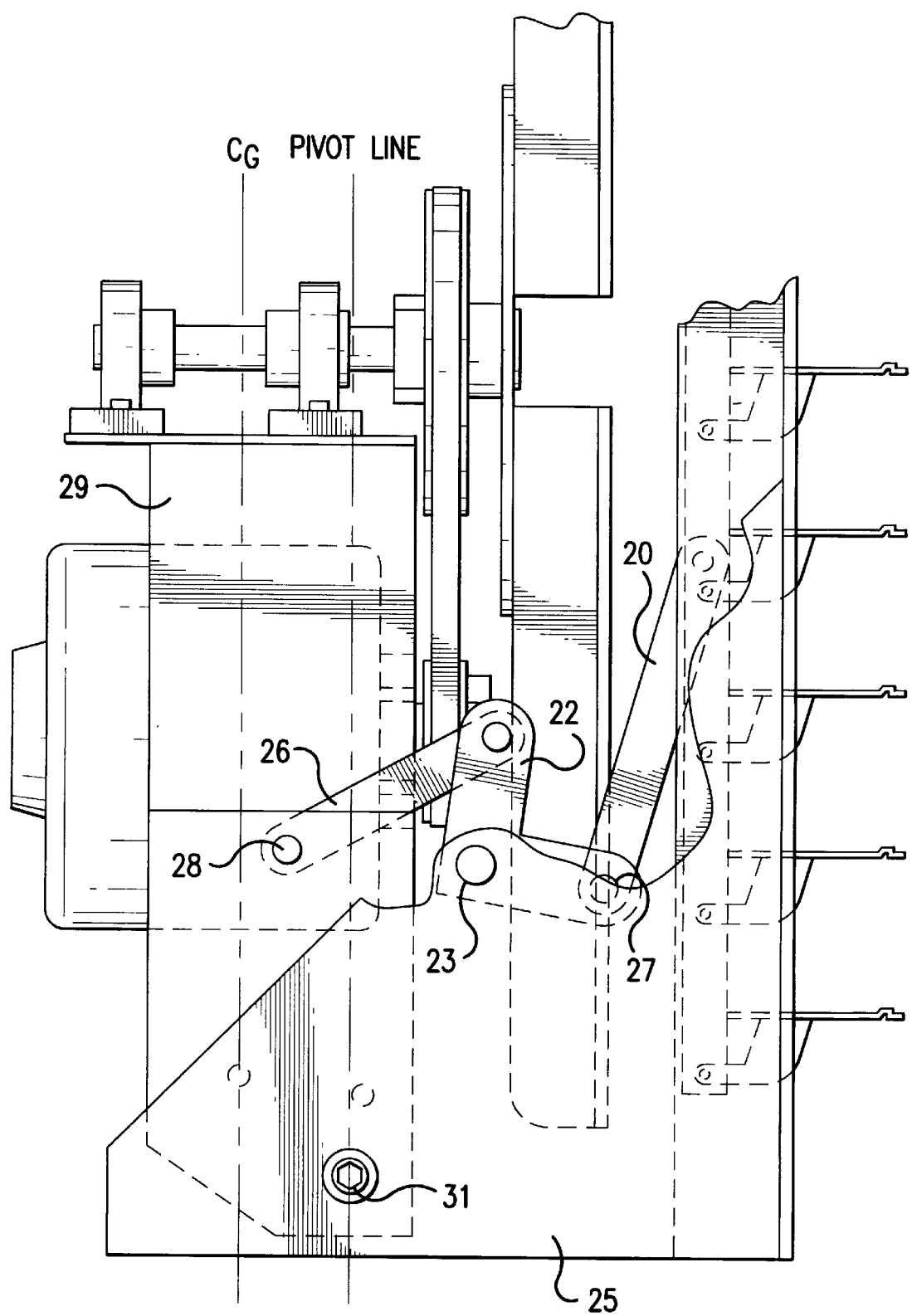
FIG. 5 shows a right side elevation of the device shown in FIG. 4.
Figure 6:
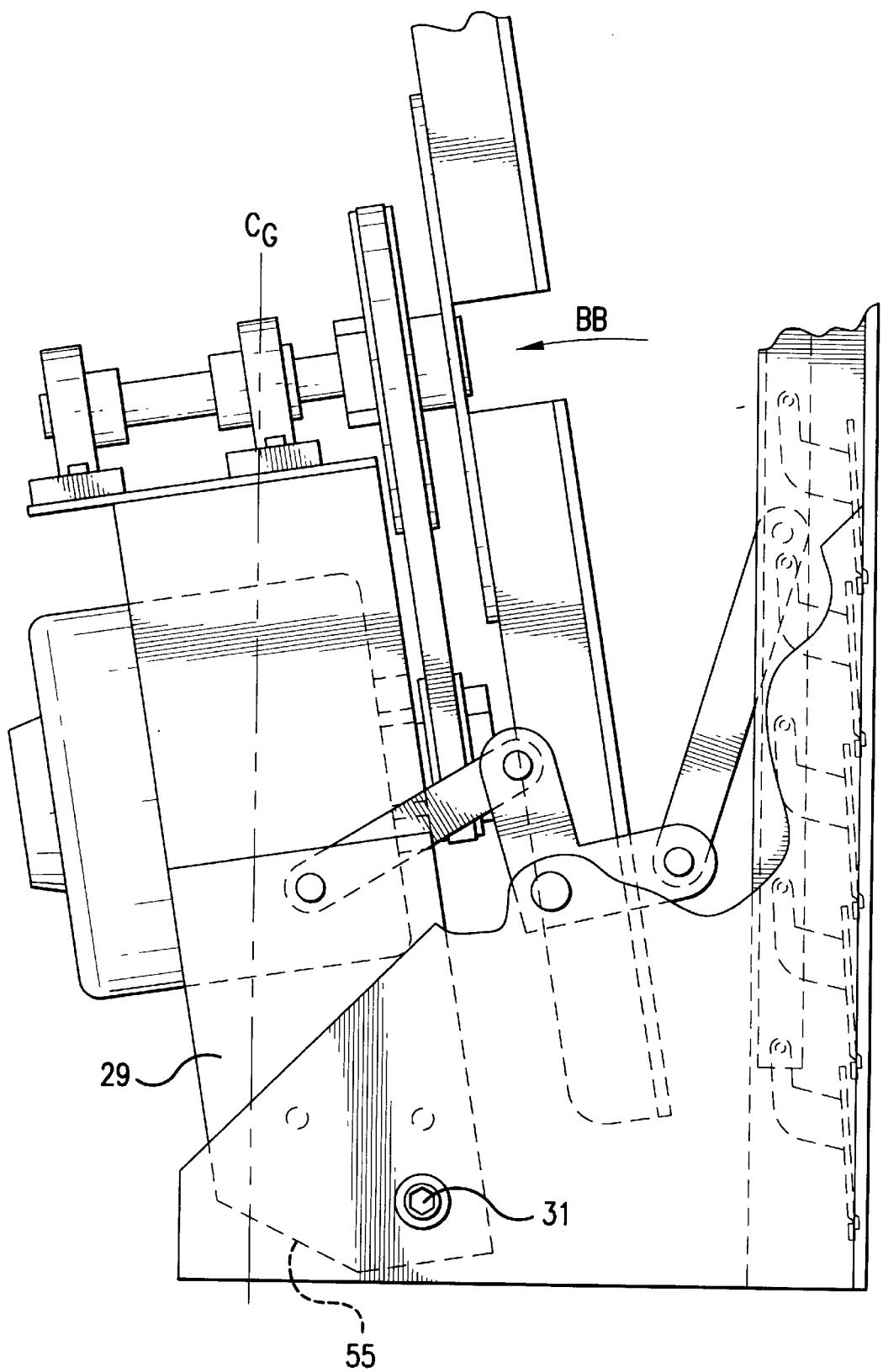
FIG. 6 shows a right side elevation of the device shown in FIG. 5, with certain parts in a different position.

Referring to the embodiment shown in FIGS. 4, 5 and 6, a fan damper box motor assembly is shown in accordance with another embodiment of my invention for use as an intake fan means. In these Figures, like numbers are used for parts which are the same as parts shown in FIGS. 1 through 3. This embodiment comprises a multi-blade damper designated generally 10 having a plurality of horizontally disposed blades 12 pivotally mounted therein so as to be actuated to swing to an open position (shown) in FIGS. 4 and 5 or to a closed position shown in FIG. 6. The blades may be conveniently mounted to perform this function by attaching them to stationary blade hangers fixed to the frame (as is known in the art). Attached at one end of each blade, by any suitable means, is a blade bracket 16. Each bracket is pivotally mounted to a blade bar 18. As the bar 18 is raised and lowered vertically (when viewed as in the Figures), the blades will either swing to a closed or opened position, respectively.

To cause this to occur, a drag link 20 is provided pivotally connected at one end to the blade bar 18 and at the other end to a pivotally mounted angled lever arm 22. The lever arm 22 has three holes to pivot about. One of these holes receives the pin 24 which is fixedly mounted to frame 25. The vertical movement aforesaid is provided when the lever arm 22 is pivoted about the pin 24 in the hole 23. Another of the holes 27 provides a means to pivotally connect the lever arm 22 to the drag link 20 at one end thereof; thus causing movement thereof in response to movement of said lever arm 22. The other end of the lever arm 22 is pivotally connected to an arm 26 mounted in such a manner that it can pivot about the rod 28. The rod 28 is fixedly mounted to the upstanding bracket 29 which is pivotally mounted at 31 to the frame 25. A motor 32 is fixedly mounted to a hinged support bracket 40. The other part 42 of the hinge of the bracket 40 is fixed to yoke 30 which is pivotally mounted to a tie rod 34 which is mounted in the frame 25 through the bracket 29. The motor has a shaft 36 upon which is mounted a pulley 44 for rotation therewith. On the top of the yoke 30 is mounted a block/bearing/shaft means designated generally 46. The shaft means supports a larger pulley 48 which is fixedly mounted to a fan having blades 38. A belt 50 is positioned in contact with the pulleys 44 and 48 to drive the fan upon rotation of the motor shaft. Spring 52 attached to the yoke 30 and the hinge 40 maintains the tension on the belt 50.

When the apparatus is in the position shown in FIG. 6, and the motor 32 is turned on, the fan blades 38 rotate clockwise and the air generated by them automatically forces the multiple blades 12 of the damper to the open position (FIGS. 4 and 5). The fan sucks air into the building, as the motor and fan assembly pivots forwardly from the position shown in FIG. 6, to the position shown in FIG. 5. The pivotally mounted parts 30, 29, 26, 22, 20, 18 and 16 cause this action. The forward travel of the fan and motor assembly is limited by this linkage of parts. The center of gravity (CG) of the motor/fan assembly remains rearward of its pivot point 31 (See FIG. 5.) Thus, when the motor is turned off, the weight of the motor/fan assembly pivots it backward (as shown by the arrow BB) to close the damper (FIG. 6). The rear lower corner of the bracket 29 is relieved at 55 to permit this rearward travel.

From what has been described, it will be noted that I have provided a means for automatically opening and closing an exhaust damper without the need for a separate motor to open the louvered blade portion of the damper.

What is claimed is:

1. In a motor/fan damper assembly, said damper assembly comprising a frame with a plurality of blades pivotally mounted therein to move between an open and closed position, the improvement comprising: actuating means connected to said blades move said blades to the open and to the closed position;

motor/fan means pivotally mounted to said frame;

means to actuate said motor/fan means to turn the motor/fan means ON or OFF;

linkage means connected to the motor/fan means and to the actuating means to cause said actuating means to move said blades to the open or the closed position depending upon whether the motor/fan means is ON or OFF.

2. The apparatus of claim 1 wherein the linkage means is constructed and arranged to move said blades to the open position when the motor is turned ON and force air therethrough in a direction away from the motor/fan means; and said motor/fan means is pivoted in said frame in a direction to move it away from said blades when said motor/fan means is turned ON.

3. The apparatus of claim 2 wherein said motor/fan means moves towards said blades, and said blades are actuated to move to the closed position when said motor/fan means is turned OFF.

4. The apparatus of claim 1 wherein the linkage means is constructed and arranged to move said blades to the open position when the motor is turned ON and draw air therethrough in a direction toward the motor/fan means; and said motor/fan means is pivoted in said frame in a direction to move it toward said blades when said motor/fan means is turned ON.

5. The apparatus of claim 4 wherein said motor/fan means moves away from said blades, and said blades are actuated to move to the closed position when said motor/fan means is turned OFF.

6. The apparatus of claim 1 wherein said motor/fan means comprises a motor attached to a fan by a pulley/belt drive.

7. The apparatus of claim 6 wherein said motor is mounted to a hinge connected to a spring which is connected to the frame and is arranged to pivot said motor away from said fan, such that tension is maintained on a belt of said pulley/belt drive.

* * * * *